United States Patent [19]

Garnett et al.

[11] Patent Number: 4,597,155

[45] Date of Patent: Jul. 1, 1986

[54] BORING MACHINE WITH WORK-HANDLING TOOL TURRET

[75] Inventors: Donald W. Garnett, Grand Ledge; John A. Watson, East Lansing, both of Mich.

[73] Assignee: The Olofsson Corporation, Lansing, Mich.

[21] Appl. No.: 528,554

[22] Filed: Sep. 1, 1983

Related U.S. Application Data

[63] Continuation of Ser. No. 245,743, Mar. 20, 1981, abandoned.

[51] Int. Cl.$^4$ .............................................. B23B 15/00
[52] U.S. Cl. .......................................... 29/564; 29/36; 82/2.5; 408/35
[58] Field of Search .................... 29/563, 564, 565, 36, 29/40, 41; 82/2.5, 36 A; 408/35

[56] References Cited

U.S. PATENT DOCUMENTS

| 3,459,076 | 8/1969 | Kummer | 29/44 |
| 3,486,209 | 12/1969 | Shultz et al. | 29/565 |
| 3,545,317 | 12/1970 | Shultz et al. | 82/36 A |
| 3,691,879 | 8/1972 | Blake | 82/2.5 |
| 3,750,245 | 8/1973 | Kennedy et al. | 82/36 A |
| 3,786,539 | 1/1974 | Foll et al. | 29/564 |
| 3,795,324 | 3/1974 | Kiwalle | 82/2.5 |
| 3,821,835 | 7/1974 | St. Andre et al. | 82/2.5 |
| 4,159,658 | 7/1979 | Parkinson | 74/816 |

FOREIGN PATENT DOCUMENTS 28403 2/1983 Japan ................................ 82/2.5

Primary Examiner—Gil Weidenfeld
Assistant Examiner—Daniel W. Howell
Attorney, Agent, or Firm—Barnes, Kisselle, Raisch, Choate, Whittemore & Hulbert

[57] ABSTRACT

A boring machine having a work-holding spindle, a turret, and means for mounting a plurality of tools on the turret. A work-handling device is mounted on the turret having means to grip and release a workpiece. The work handling device is capable of loading and unloading the spindle.

3 Claims, 7 Drawing Figures

BORING MACHINE WITH WORK-HANDLING TOOL TURRET

This is a continuation of application Ser. No. 245,743 filed Mar. 20, 1981, now abandoned.

This invention relates generally to a machine for removing metal from a workpiece and refers more particularly to a boring machine having a tool-supporting turret provided with a work-handling device.

BACKGROUND AND SUMMARY OF THE INVENTION

At present, separate work-handling mechanism is employed to load and unload the spindle of a boring machine. It is among the objects of this invention to provide a machine wherein the turret on which the tools are supported is equipped with a work-handling device which is capable of loading and unloading the spindle. More specifically, the machine of this invention is a two-spindle boring machine having two turrets, one for each spindle, wherein the spindles are loaded and unloaded and the work is transferred from one spindle to the other by means of the work-handling devices on the turrets. Means are provided to move one turret from a pick-up station to one spindle in order to pick up a workpiece by its work-handling device and transfer it to that spindle; also to retrieve the workpiece or part from the spindle after machining and transfer it to the work-handling device associated with the second turret; thence to invert and transfer the part to the second spindle for machining of the back face. Means are also provided to move the other turret from the other spindle to a discharge station in order to remove a workpiece from the other spindle by its work-handling device and transfer it to the discharge station.

These and other objects will become more apparent from the following description and drawings of a specific embodiment of the invention.

IN THE DRAWINGS

Figure 1:
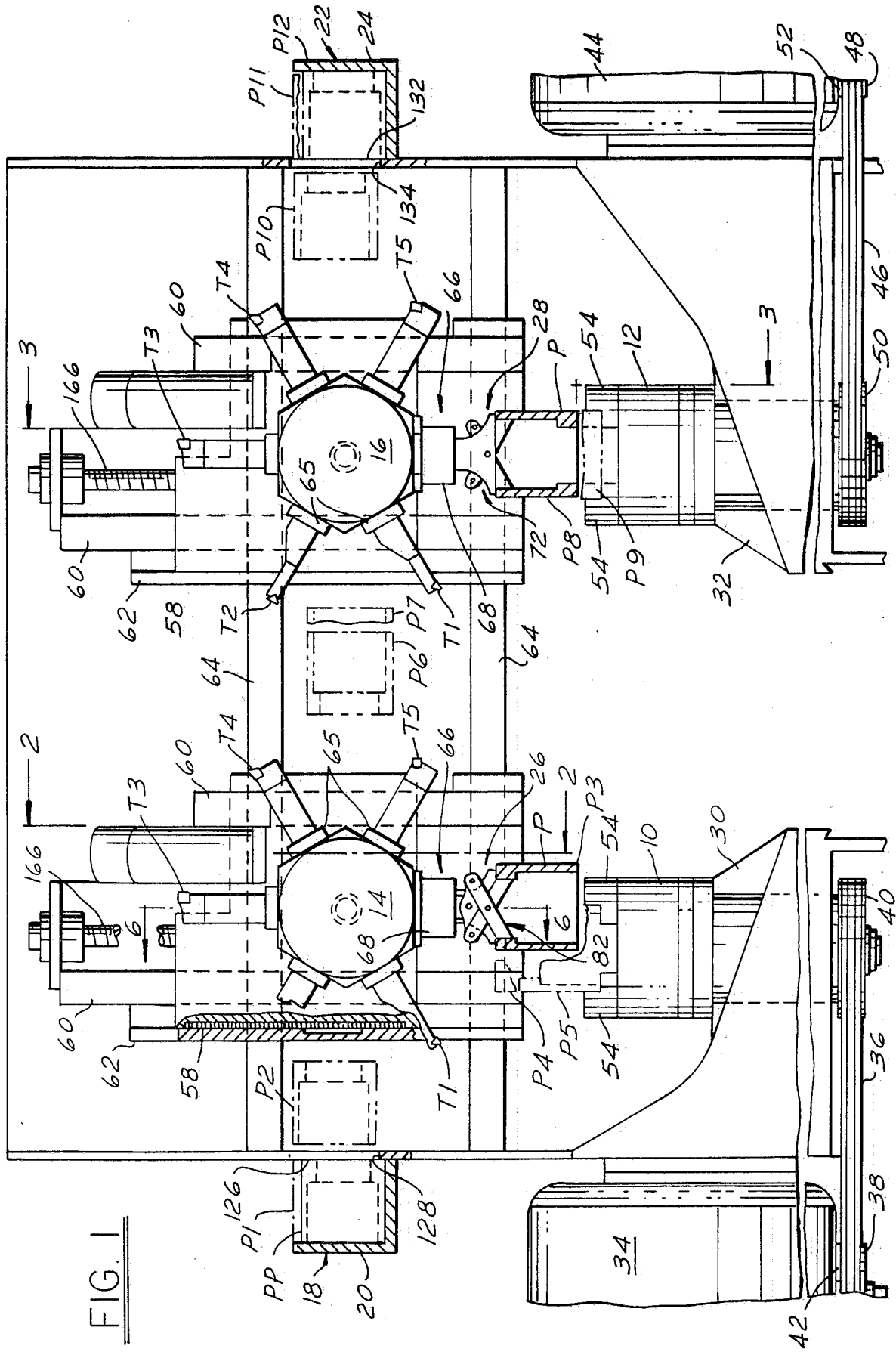
FIG. 1 is an elevational view with parts in section of a two-spindle boring machine embodying the invention.
Figure 2:
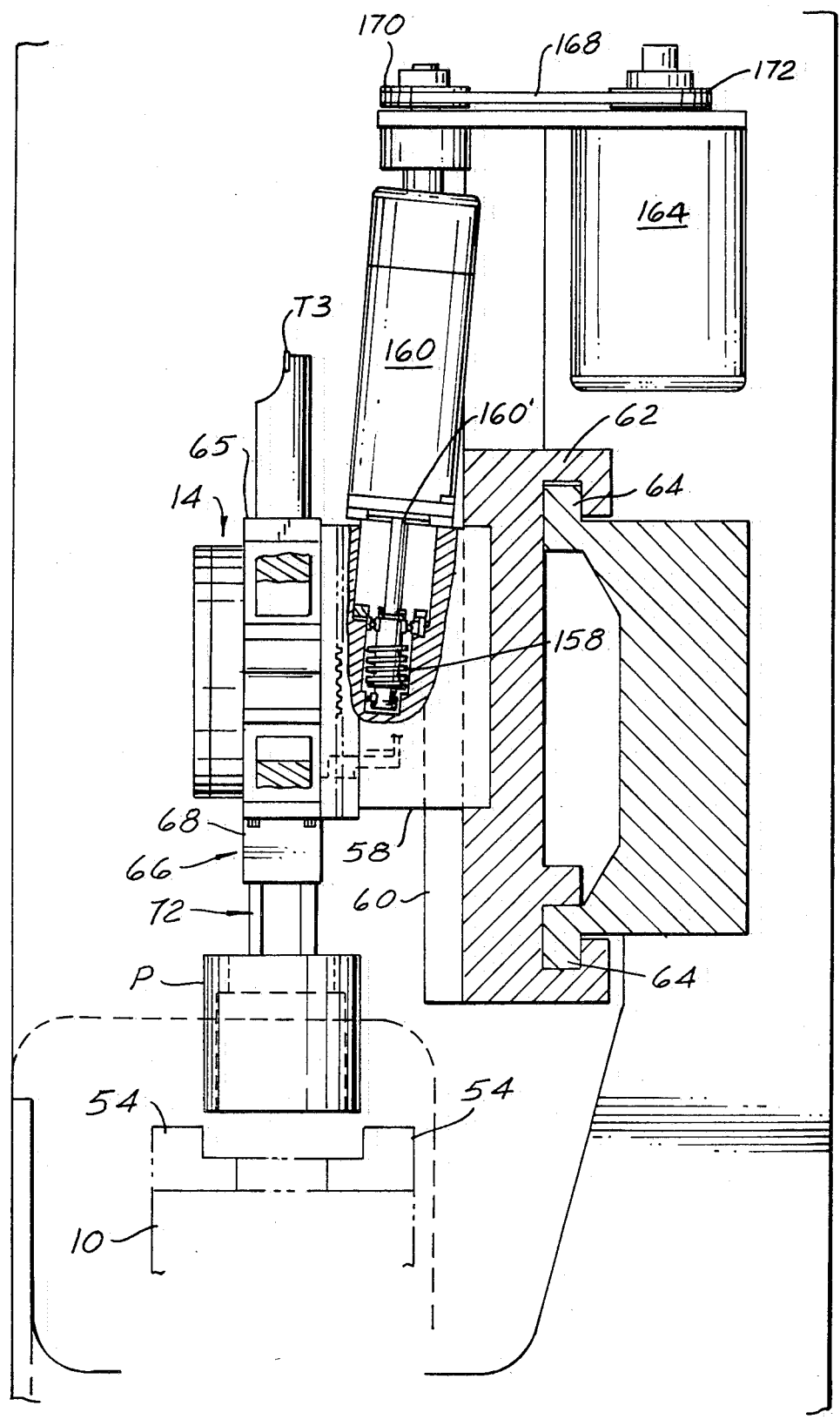
FIG. 2 is a view taken on the line 2—2 in FIG. 1.
Figure 3:
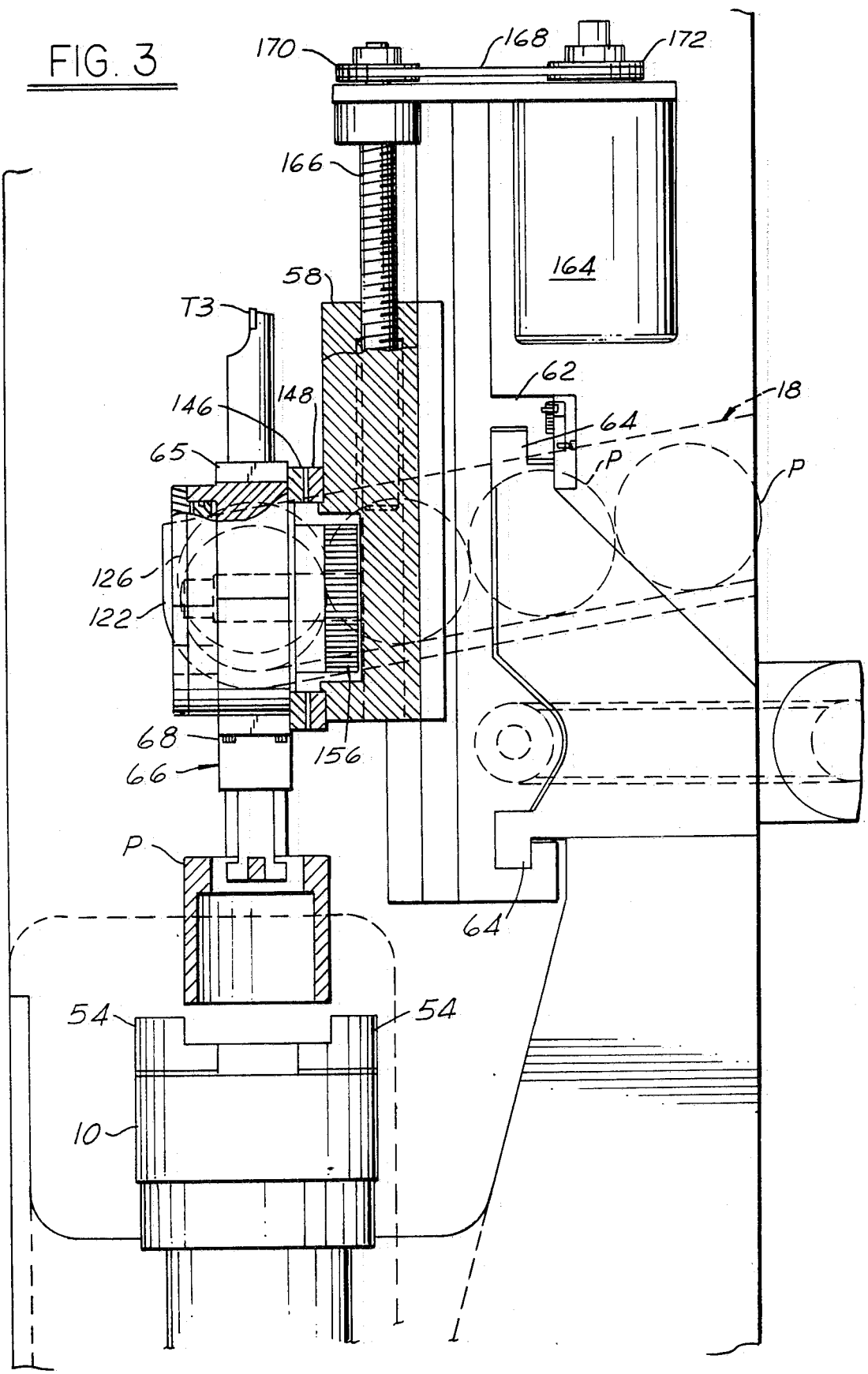
FIG. 3 is a view taken on the line 3—3 in FIG. 1.
Figure 4:
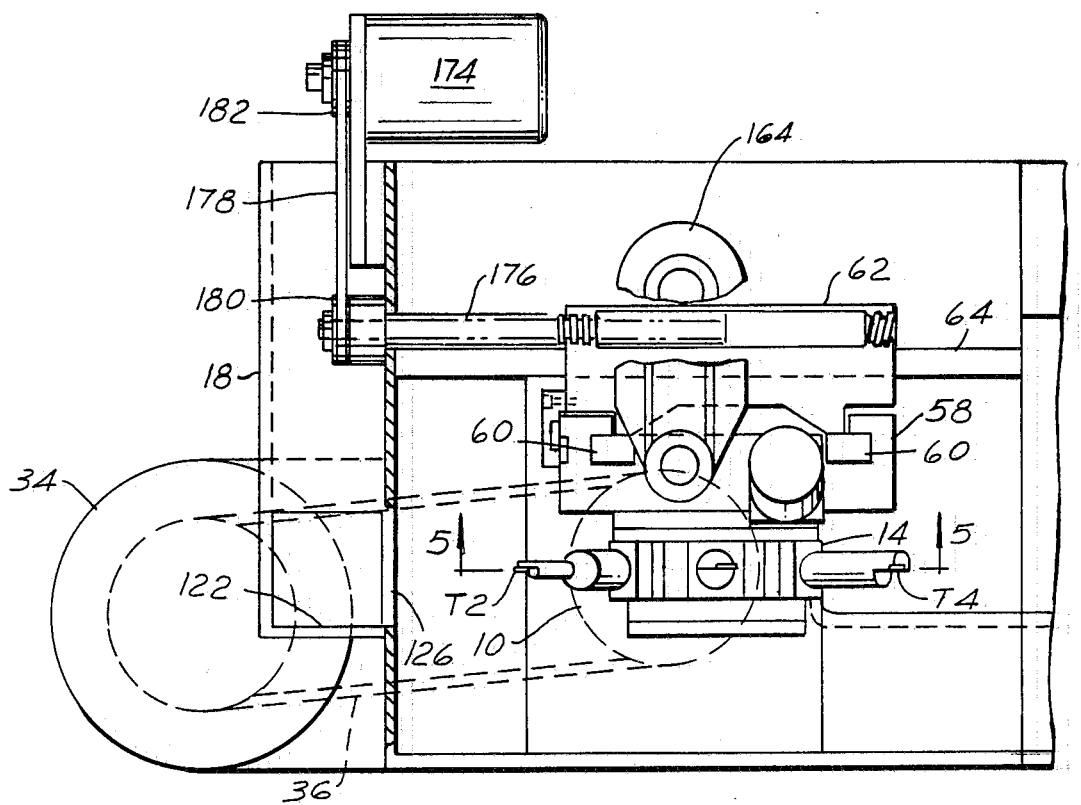
FIG. 4 is a top plan view with parts in section showing one portion, including a work-holding spindle and the associated turret, of the machine.

Referring now more particularly to the drawings, the boring machine comprises a pair of vertical work-holding spindles 10 and 12, tool-supporting turrets 14 and 16 respectively associated with the spindles 10 and 12, a track or chute 18 having a work pick up station 20, and a track or chute 22 having a work discharge station 24. The turret 14 has a work-handling device 26 and turret 16 has a work-handling device 28. The spindles are loaded and unloaded and the work is transferred from one spindle to the other by means of the work-handling devices on the turrets.

The spindles 10 and 12 are disposed in laterally spaced relation in housings 30 and 32. Spindle 10 is rotated by a motor 34 and belts 36 extending around sheaves 38 and 40 on the motor output shaft 42 and spindle 10 respectively. Spindle 12 is rotated by a motor 44 and belts 46 extending around sheaves 48 and 50 on the motor output shaft 52 and spindle 12 respectively. Each spindle has chuck jaws 54 which are radially movable toward and away from each other to clamp and unclamp a workpiece P as by means of air pressure directed through suitable passages, not shown.

The turrets 14 and 16 are disposed above the respective spindles 10 and 12 and in the present instance are of identical construction. Each turret is rotatably and axially slidably mounted on a horizontal spindle 56 of a support 58. Each support 58 is mounted for vertical sliding movement on vertical rails 60 carried by a frame 62. Each frame 62 is mounted for horizontal sliding movement on fixed horizontal rails 64.

A plurality of tools T1-T5 are mounted on each turret in angularly spaced relation about the axis thereof by supports 65. Any number of tools may be thus mounted but in this instance the turret has five such tools in positions spaced 60° apart, the sixth position on the turret being occupied by a work-handling device 66.

Each work-handling device has an open-ended cylindrical housing 68 disposed radially with respect to the turret and provided with a flange 70 bolted to the turret. A work abutment member 72 has a cylindrical body 74 axially slidably disposed within housing 68 and held therein by an annular retaining plate 75 bolted to the outer end of the housing which engages an external shoulder 76 at the outer end of the body. The abutment member 72 has laterally spaced legs 78 and 79 projecting outwardly from the body 74 and terminating in work abutment surfaces 80 and 81.

Figure 5:
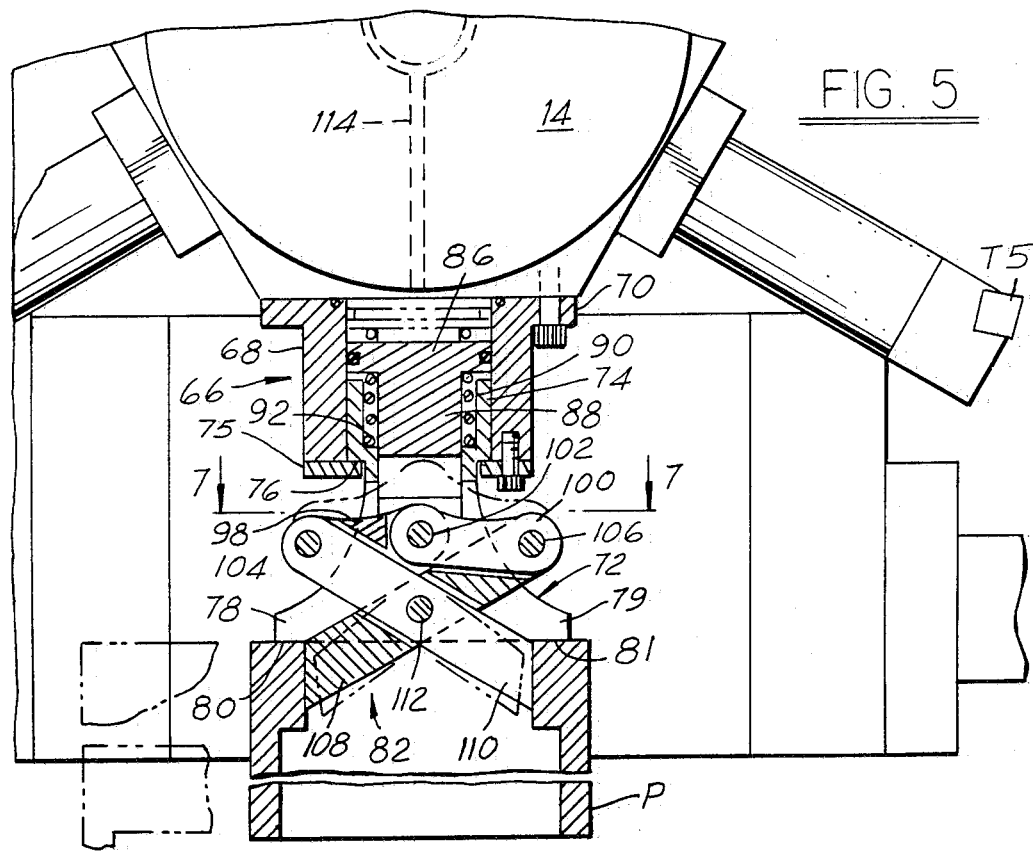
FIG. 5 is a view with parts in section taken on the line 5—5 in FIG. 4.

A toggle clamping unit 82 has a piston 86 in sealed, sliding contact with the inner wall of housing 68. A body 88 extends outwardly from the piston through the body 74 of the abutment member 72 in spaced relation to the latter to accommodate a coil spring 90 compressed between the piston 86 and internal shoulder 92 of the abutment member. A pair of laterally spaced legs 94 and 96 project outwardly from body 88 of the clamping unit 82 terminating a substantial distance inwardly of the abutment surfaces 80 and 81 of abutment member 72. Links 98 and 100 are pivoted at one end on pin 102 extending between legs 94 and 96. The other ends of the links 98 and 100 are pivoted by pins 104 and 106 to clamping fingers 108 and 110 respectively. Fingers 108 and 110 are pivoted together intermediate their ends by a pin 112 extending between and carried by legs 78 and 79 of the abutment member 72. The free ends of the fingers are adapted to internally clamp and hold a cylindrical workpiece P when the end of the workpiece contacts the abutment surfaces 80 and 81 as best shown in FIG. 5. Normally, spring 90 retracts piston 86 to the dotted line position, collapsing the clamping fingers 108 and 110 to release the work. Spring 90 also forces the body 74 of abutment member 72 outward against plate 75 with a yielding pressure. The spring 90 thus acts as a cushion when the abutment surfaces 80 and 81 contact the work. Fluid under pressure from a suitable source and admitted to the upper end of housing 68 through passage 114 in the turret and the passage 116 and annular groove 118 in spindle 56 acts to extend the piston 86 to the solid line position expanding the clamping fingers 108 and 110 to grip the work.

To one side of turret 14 there is a chute 18 for supporting a row of workpieces P to be machined. The chute is sloped downward to its lower end where a stop 122 locates a workpiece at the work pick-up station 20. A hole 126 at the work pick-up station permits the fingers 108 and 110 of the work handling device 66 of turret 14 to enter and pick up a workpiece. A lower ledge 128 at the pick-up station prevents the workpiece from accidentally falling out of chute 18 through hole 126.

To one side of turret 16 there is a chute 22 for receiving workpieces after they have been machined. The chute 22 may be sloped downward from its upper end which constitutes a work discharge station 24 and has a hole 132 to permit a machined workpiece to be deposited in the chute by the work-handling device of turret 16. A lower ledge 134 at the discharge station 24 prevents the workpiece from falling out of chute 22 through hole 132 and also acts as a stripper lip when the work-handling device is withdrawn from the work.

Figure 6:
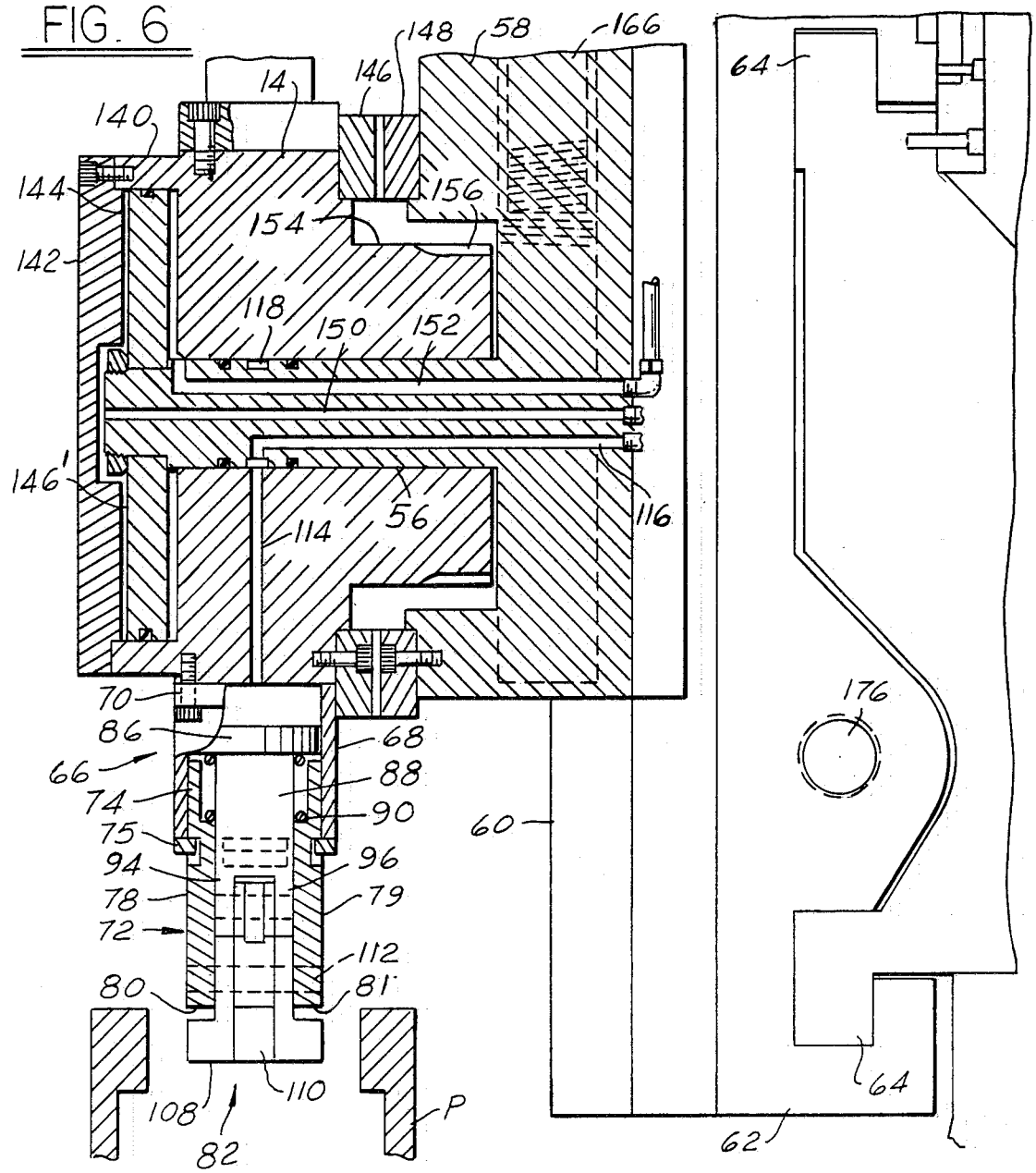
FIG. 6 is a view with parts in section taken on the line 6—6 in FIG. 1.
Figure 7:
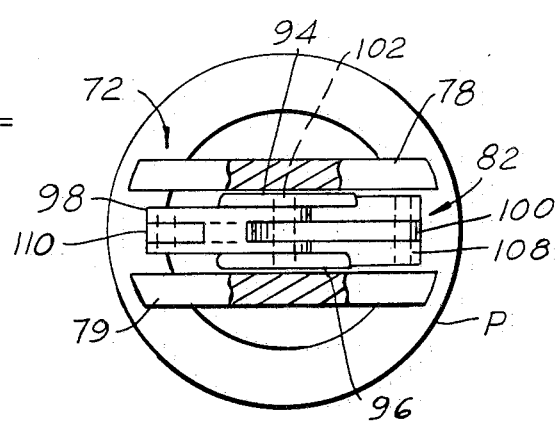
FIG. 7 is a fragmentary sectional view taken on the line 7—7 in FIG. 5.

Referring to FIG. 6, the turret has an integral cylindrical ring 140 projecting beyond its front face which is covered by a cap 142 to define a cylindrical chamber 144. The spindle 56 on which the turret is mounted extends into chamber 144 and has a piston 146' fixed on its end which sealingly engages the cylindrical wall of chamber 144. Fluid under pressure in the chamber at the rod end of the piston moves the turret axially to the right in FIG. 6, causing the circle of face gear teeth on ring 146 secured to the turret to engage the circle of face gear teeth on ring 148 secured to the support 58 and lock the turret against rotation. Fluid under pressure in the chamber at the head end of the piston moves the turret axially to the left in FIG. 6, causing the teeth on rings 146 and 148 to disengage, permitting the turret to be rotated. Passages 150 and 152 in spindle 56 lead to the head and rod ends respectively of chamber 144 so that one end may be subjected to fluid under pressure while the other is relieved of pressure by means of a fluid pressure source and suitable valving not shown.

The turret has a rearward cylindrical extension 154 provided with teeth 156 slidably engaged by a worm 158. The worm engages with the teeth 156 throughout the axial movement of the turret required to engage and disengage the face gear teeth on rings 146 and 148. The worm is rotated one way or the other to rotate the turret by a reversible motor 160 which rotates the shaft 160' on which the worm is mounted. The worm 158 can rotate the turret only when the teeth 146 and 148 are disengaged. The motor 160 is mounted on support 58.

Support 58 is raised or lowered on rails 60 of frame 62 by a reversible motor 164 driving a screw 166 which threads into support 58. A drive belt 168 extends around sheaves 170 and 172 on the screw and the motor output shaft to effect rotation of the screw in either direction by the motor. Motor 164 is mounted on frame 62.

Frame 62 is moved left or right on rails 64 by a reversible motor 174 driving a screw 176 which threads into frame 62. Drive belt 178 extends around sheaves 180 and 182 on the screw and motor output shaft to effect rotation of the screw in either direction. Motor 174 is mounted on the fixed frame of the machine.

The operation of the machine is as follows: The workpieces to be bored and/or turned for finishing are placed in a rolling attitude in the inclined track or chute 18, with the lowermost workpiece located for pick-up in position PP at the pick-up station 20. The left turret 14 in FIG. 1 is operated by fluid pressure in chamber 144 to disengage the rings of teeth 146 and 148 to permit the turret to be rotated by worm 158 to place the work-handling device 66 in the 9 o'clock position, after which the teeth on the rings 146 and 148 are reengaged. Motor 164 is operated to raise the turret so that the work-handling device 66 is on the center line of the work in position PP at the pick-up station. The turret 14 is moved left by operation of motor 174 so that the retracted fingers 108 and 110 of work-handling device 66 enter the work. The abutment surfaces 80 and 81 contact the end of the work. Spring 90 applies an outward pressure, permitting the abutment surfaces 80 and 81 to compress or cushion against varying lengths of the work. Workpieces of different lengths accordingly may be handled and machined.

Fluid pressure in passage 114 applied against piston 86 causes the fingers 108 and 110 to expand, clamping on the inside diameter of the work through operation of the toggle mechanism 82. The turret 14 is then raised by motor 164 to effect a work escapement position P1 above ledge 128, after which turret 14 is moved to the right by motor 174 to extract the work to position P2.

Turret 14 is now rotated counterclockwise by worm 158, the locking teeth of rings 146 and 148 having first been disengaged, to place the work-handling device 66 in the 6 o'clock position and the work in position P3. After relocking the turret with the work-handling device in the 6 o'clock position, the turret is moved left to align the center line of work position P4 with the center line of the expanded chuck jaws 54 of spindle 10. The turret 14 is then lowered to place the work in the spindle chuck jaws where shown at position P5. The chuck jaws 54 are then operated by fluid pressure to clamp on the outside diameter of the work by fluid pressure. Fluid pressure is now removed from piston 86, allowing the clamping fingers 108 and 110 to retract under the urging of compression spring 90 and release the work. Turret 14 is now raised to extract the fingers 108 and 110, leaving the work clamped in the spindle chuck jaws 54 in position P5.

The turret 14 is now rotated to bring the desired tool station T1-T5 to the 6 o'clock position for machining. The spindle 10 is rotated by motor 34 through belts 36. The desired paths and tool positions may be programed to follow and complete all machining operations in the work position P5, after which the rotation of spindle 10 is stopped. The turret 14 is now rotated and locked with the work-handling device 66 at the 6 o'clock position on the vertical center line of the spindle 10. With the clamping fingers 108 and 110 retracted, turret 14 is lowered, causing the abutment surfaces 80 and 81 to contact the end of the work and fluid pressure in passage 114 applied against piston 86 causes fingers 108 and 110 to expand and grip the work. Chuck jaws 54 are expanded by release of fluid pressure to release their grip on the work. Turret 14 is now moved upward, withdrawing the work to position P4, and is then rotated counterclockwise to place work-handling device 66 at the 3 o'clock position P6 to await operation of the right turret 16.

Right turret 16 is rotated to place its work-handling device 66 at the 9 o'clock position and on the center line of work position P6, with the clamping fingers 108 and 110 in the retracted or released position. The right turret 16 is moved left to cause the work-handling device 66 to enter the open end of the work in position P6. As already stated, the right turret 16 and its work-handling device are duplicates of the left turret 14 and its work-handling device and have the same movement and operation capabilities. The clamping fingers 108 and 110 on the work-handling device 66 of turret 16 are expanded by fluid pressure to clamp the work when in position P6, after which the clamping fingers of the left turret 14 are retracted.

Turret 16 moves right, extracting the work from the work handling device of the left turret 14 to position P7. The left turret 14 may now begin its next cycle of work handling.

The right turret 16 rotates counterclockwise to place the work in position P8 at the 6 o'clock position and on the center line of the open chuck jaws 54 of right spindle 12. The right turret 16 is lowered to place the work in the spindle chuck jaws 54 in the work position P9. Chuck jaws 54 are clamped on the outside diameter of the work in position P9 by fluid pressure. Fluid pressure is removed from the piston 86 of the work-handling device of turret 16, allowing the clamping fingers 108 and 110 to unclamp. The right turret no raises to extract the clamping fingers 108 and 110, leaving the work clamped in inverted position P9.

The turret 16 is rotated to bring the desired tool station T1-T5 to the 6 o'clock position for machining. The spindle 12 is rotated. The desired paths and tool positions are programed to follow and complete all machining operations on the inverted end, work position P9. The spindle 12 is stopped. Turret 16 is rotated to position work-handling device 66 at the 6 o'clock position and on the vertical center line of spindle 12. With clamping fingers 108 and 110 retracted, turret 16 is lowered, causing the clamping fingers to enter the work at position P9, after which the fingers are expanded to grip the work. The chuck jaws release the work.

Turret 16 moves upward, extracting the work to position P8. Turret 16 rotates counterclockwise to place the work-handling device 66 at the 3 o'clock position P10 and on the center line of the discharge station 24 of the discharge chute 22. Turret 16 moves right to place the work in the discharge station 24 of the chute, work position P11. Turret 16 moves downwardly slightly to place the work in position P12 behind the stripper lip 134. The clamping fingers 108 and 110 are retracted and the turret 16 moved left to extract the fingers from the work at position P12 after which the work has a rolling discharge out of the chute 22. Turret 16 is ready to begin its next cycle.

Loading and unloading the spindle of a boring machine by means of a work-handling device on the tool turret provides part handling at a cost which is very low compared to the cost of employing separate loaders and unloaders. In the machine disclosed herein, parts may be transferred from spindle one to spindle two for complete finishing of a part which requires machining operations on both ends. Optionally, a part may be returned to spindle one in the event that finishing operations are required on face one after rough and finish operations on face two. As a further option, two completely different parts may be machined simultaneously on spindles one and two in which case spindle 10 may have associated with it a discharge chute like chute 22 positioned either above or below pick-up chute 18, and spindle 12 may have associated with it a pick-up chute like chute 18 positioned either above or below the discharge chute 22.

We claim:

1. In a machine tool for removing metal from a workpiece having internal surfaces by means of which it may be gripped, laterally spaced first and second turrets, a support for each turret, means rotatably mounting each turret on its associated support, a plurality of tools and a work-handling device having radially movable fingers capable of internally gripping the workpiece mounted on each turret in angularly spaced relation about the axis of rotation thereof, a work-holding spindle for each turret disposed in spaced relation to the axis of rotation thereof, means guiding the support for said first turret for straight line movement along a first path toward and away from the spindle associated with said first turret, means guiding the support for said second turret for straight line movement along a second path parallel to said first path toward and away from the spindle associated with said second turret, means guiding both turret supports for straight line movement along a third path at right angles to said first and second paths toward and away from each other, means for rotating each turret so as to bring a selected tool or work-handling device into alignment with the associated spindle when the associated support is in a predetermined position along said third path or to bring said work-handling devices of both turrets into alignment with each other when said supports are in predetermined positions along said first and second paths, respectively, means for independently moving said supports along said respective first and second paths when said supports are in said predetermined positions along said third path to bring a selected tool on each turret into operative relation with the associated spindle to remove metal from the workpiece held thereby or to bring said work-handling device on each turret into operative relation with the associated spindle to load or unload said spindle depending on the rotative position of said turret, and means for moving said supports along said third path when they are in said predetermined positions along said first and second paths and when said turrets are so rotated as to align said work-handling devices to internally grip and transfer the workpiece from one work-handling device to the other, said work-handling device on each turret being adapted to internally grip the workpiece by one end thereof, the workpiece when transferred from the work-handling device of one turret to that of the other being internally gripped by the work-handling device of the receiving turret on the end thereof opposite that which was internally gripped by the work-handling device of the turret from which it was received so that the workpiece will be inverted when loaded on the spindle associated with the receiving turret, a work pick-up station adjacent said first turret, a work discharge station adjacent said second turret, means for moving the support for the first turret along a straight line toward and away from said work pick-up station when said first turret is so rotated as to align its work-handling device with said work pick-up station to internally grip and transfer the workpiece from said work pick-up station to the work-handling device of said first turret, and means for moving the support for said second turret along a straight line toward and away from said work discharge station when said second turret is so rotated as to align its work-handling device with said work discharge station to internally grip and transfer the workpiece from the work-handling device of said second turret to said work discharge station.

2. Structure as defined in claim 1, wherein said work pick-up station has a ledge retaining the workpiece against accidental displacement, and said work discharge station has a ledge retaining the workpiece against accidental displacement and stripping the workpiece from said work-handling device when said work-handling device is withdrawn from the workpiece.

3. Structure as defined in claim 1, wherein said straight line along which said support for said first turret moves toward and away from said work pick-up station and said straight line along which said support for said second turret moves toward and away from said work discharge station are along said third path.

* * * * *